United States Patent [19]

McGee et al.

[11] Patent Number: 5,697,641
[45] Date of Patent: Dec. 16, 1997

[54] INFLATABLE VEHICLE OCCUPANT PROTECTION DEVICE AND METHOD OF INFLATING THE DEVICE

[75] Inventors: Robert F. McGee, Clawson; Steven W. Maurer, Clinton Township, both of Mich.

[73] Assignee: TRW Vehicle Safety Systems Inc., Lyndhurst, Ohio

[21] Appl. No.: 649,130

[22] Filed: May 14, 1996

[51] Int. Cl.⁶ .......................... B60R 21/16; B60R 21/22
[52] U.S. Cl. ........................ 280/743.1; 280/730.2
[58] Field of Search .................... 280/730.2, 743.1, 280/739, 729, 728.1, 736, 730.1

[56] References Cited

U.S. PATENT DOCUMENTS

| | | |
|---|---|---|
| 3,642,303 | 2/1972 | Irish et al. |
| 4,262,931 | 4/1981 | Strasser et al. |
| 4,360,223 | 11/1982 | Kirchoff. |
| 5,240,283 | 8/1993 | Kishi et al. |
| 5,340,151 | 8/1994 | Sato. |
| 5,435,594 | 7/1995 | Gille. |
| 5,524,924 | 6/1996 | Steffens et al. ............ 280/730.2 |
| 5,556,128 | 9/1996 | Sinnhuber et al. ........... 280/743.1 |
| 5,586,782 | 12/1996 | Zimmerman, II et al. ...... 280/730.2 |

FOREIGN PATENT DOCUMENTS 6-227348  8/1994  Japan.

*Primary Examiner*—Paul N. Dickson
*Attorney, Agent, or Firm*—Tarolli, Sundheim, Covell, Tummino & Szabo

[57] ABSTRACT

An inflatable vehicle occupant protection device (14), such as an air bag, includes first and second inflatable structures (72,74). The first inflatable structure (72) has an inflated location between the occupant's thorax and a side portion (20) of the vehicle. A second inflatable structure (74) has an inflated location between the occupant's head and the side portion (20) of the vehicle. A valve (80) increases the pressure of inflation fluid in the second inflatable structure (74) in response to engagement of the occupant's thorax with the first inflatable structure (72) prior to subsequent engagement of the occupant's head with the second inflatable structure (74). The valve (80) has an open condition permitting inflation fluid to flow from the first inflatable structure (72) to the second inflatable structure (74) under the influence of pressure in the first inflatable structure (72), and has a closed condition blocking the inflation fluid from flowing back from the second inflatable structure (74) to the first inflatable structure (72) under the influence of the pressure in the second inflatable structure (74).

4 Claims, 4 Drawing Sheets

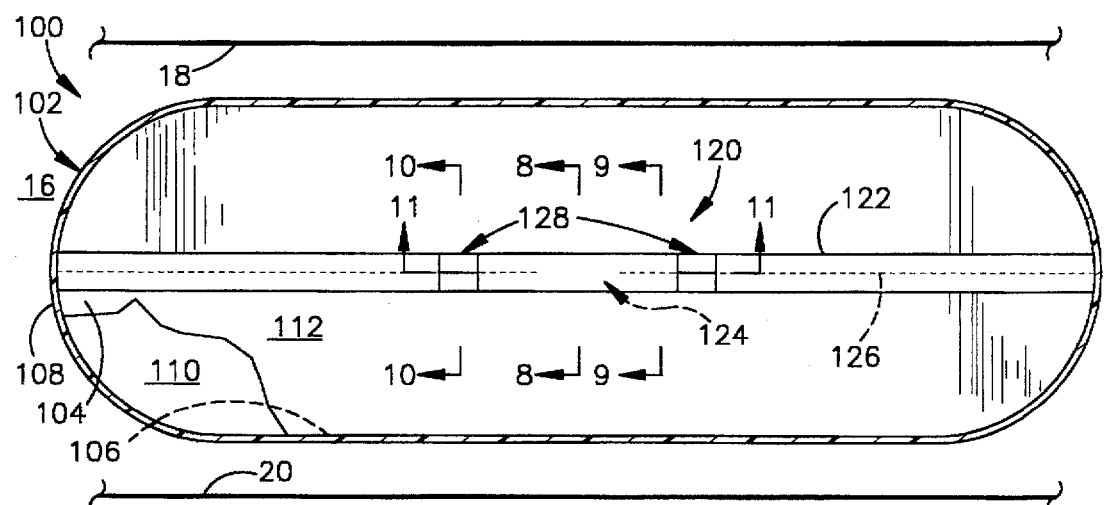
Fig.7
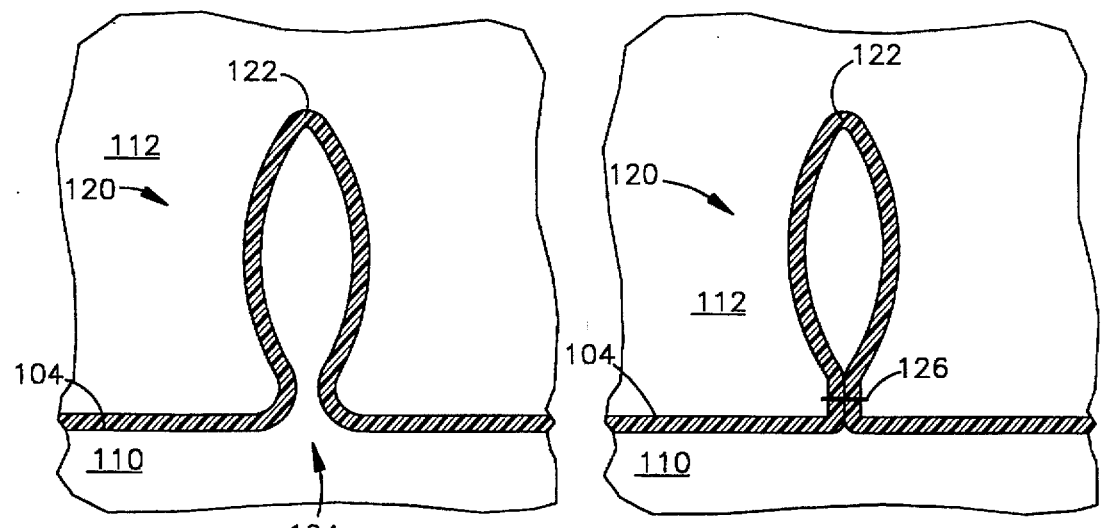
Fig.8
Fig.9
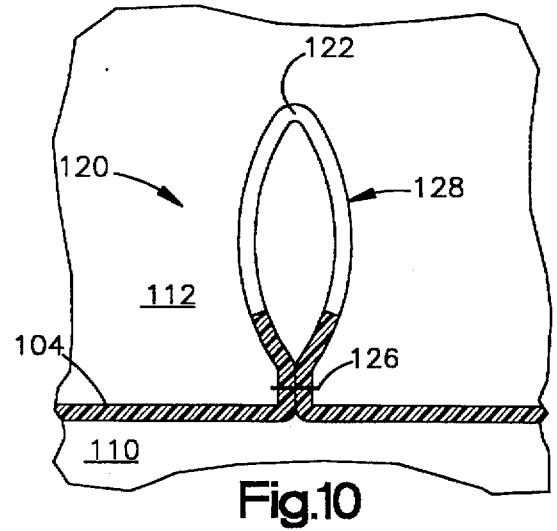
Fig.10

INFLATABLE VEHICLE OCCUPANT PROTECTION DEVICE AND METHOD OF INFLATING THE DEVICE

FIELD OF THE INVENTION

The present invention relates to an inflatable vehicle occupant protection device, such as an air bag, and to a method of inflating the device.

BACKGROUND OF THE INVENTION

A particular type of inflatable vehicle occupant protection device is commonly referred to as an air bag. An air bag is stored in a vehicle in a folded, uninflated condition at a location adjacent to the vehicle occupant compartment. When the vehicle experiences a collision of at least a predetermined severity, inflation fluid is directed to flow from a source of inflation fluid into the air bag. The inflation fluid inflates the air bag from the folded, uninflated condition to an unfolded, inflated condition in which the air bag extends into the vehicle occupant compartment. When the air bag is inflated into the vehicle occupant compartment, it helps to protect an occupant of the vehicle from forcefully striking, or being struck by, parts of the vehicle as a result of the collision.

In certain applications, an air bag is inflated when the vehicle experiences a side impact collision, such as a collision in which an impact is directed against a door at the side of the vehicle. The air bag is then inflated between the door and an occupant of an adjacent seat so as to help protect the occupant from being forcefully struck by the door. The manner in which the air bag protects the occupant is determined by factors such as the pressure of the inflation fluid in the air bag and the configuration and location of the air bag relative to the occupant.

SUMMARY OF THE INVENTION

The present invention comprises an inflatable vehicle occupant protection apparatus and a method of inflating the apparatus upon the occurrence of a side impact vehicle collision.

In accordance with the present invention, the apparatus comprises first and second inflatable structures. The first inflatable structure has an inflated location between a vehicle occupant's thorax and a side portion of the vehicle. The second inflatable structure has an inflated location between the occupant's head and the side portion of the vehicle. A valve means increases the pressure of inflation fluid in the first inflatable structure in response to engagement of the occupant's thorax with the first inflatable structure prior to subsequent engagement of the occupant's head with the second inflatable structure.

The valve means has an open condition and a closed condition. When in the open condition, the valve means permits inflation fluid to flow through the valve means from the first inflatable structure to the second inflatable structure under the influence of pressure in the first inflatable structure. When in the closed condition, the valve means blocks the inflation fluid from flowing back through the valve means from the second inflatable structure to the first inflatable structure under the influence of pressure in the second inflatable structure.

When the apparatus is inflated in accordance with the present invention, the first inflatable structure becomes contracted between the occupant's thorax and the side portion of the vehicle. Such contraction of the first inflatable structure occurs when the side impact collision causes the side portion of the vehicle to push the first inflatable structure against the occupant's thorax. The valve means then permits inflation fluid to flow through the valve means from the first inflatable structure to the second inflatable structure. This causes the pressure in the second inflatable structure to increase to a level which is greater than the pressure level in the first inflatable structure. The valve means switches to the closed condition in response to the increased pressure in the second inflatable structure. The valve means then sustains pressure in the second inflatable structure for a period of time by blocking a reverse flow of the inflation fluid through the valve means. As a result, pressure in the second inflatable structure is sustained at least until the second inflatable structure is moved into engagement with the occupant's head.

BRIEF DESCRIPTION OF THE DRAWING

Further features of the present invention will become apparent to those skilled in the art to which the present invention relates from reading the following description with reference to the accompanying drawings, in which:

FIG. 7 is a view similar to FIG. 4 showing an inflatable vehicle occupant protection device comprising a second embodiment of the present invention;

FIG. 8 is a view taken on line 8—8 of FIG. 7;

FIG. 9 is a view taken on line 9—9 of FIG. 7;

FIG. 10 is a view taken on line 10—10 of FIG. 7;

DESCRIPTION OF PREFERRED EMBODIMENT

Figure 2:
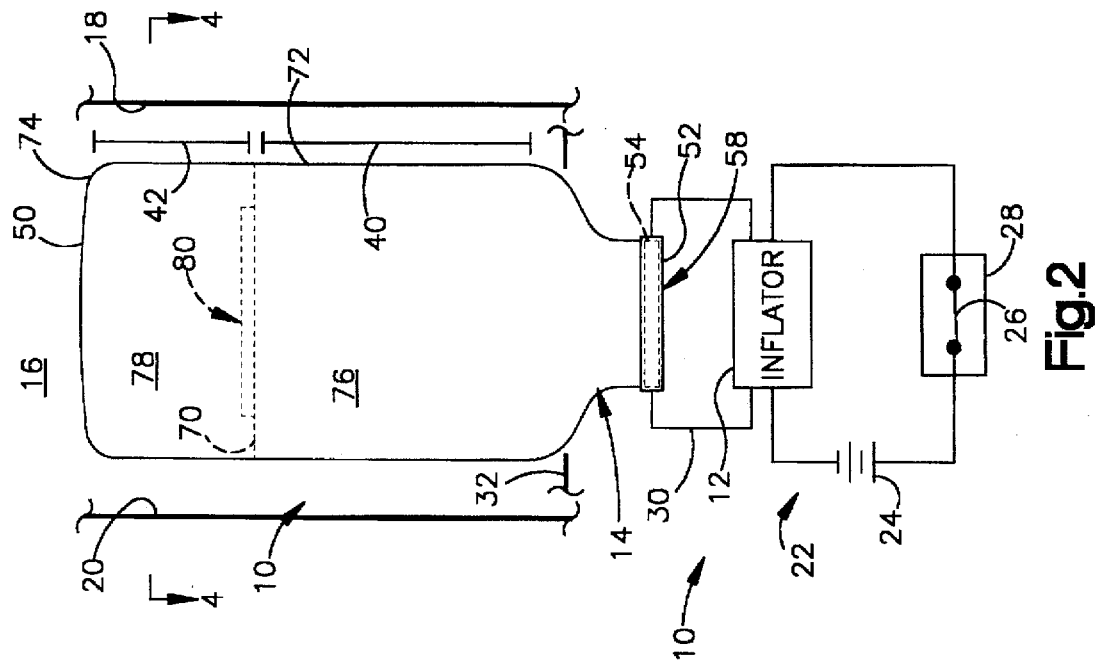
FIG. 2 is a view similar to FIG. 1 showing the apparatus in an actuated condition.
Figure 1:
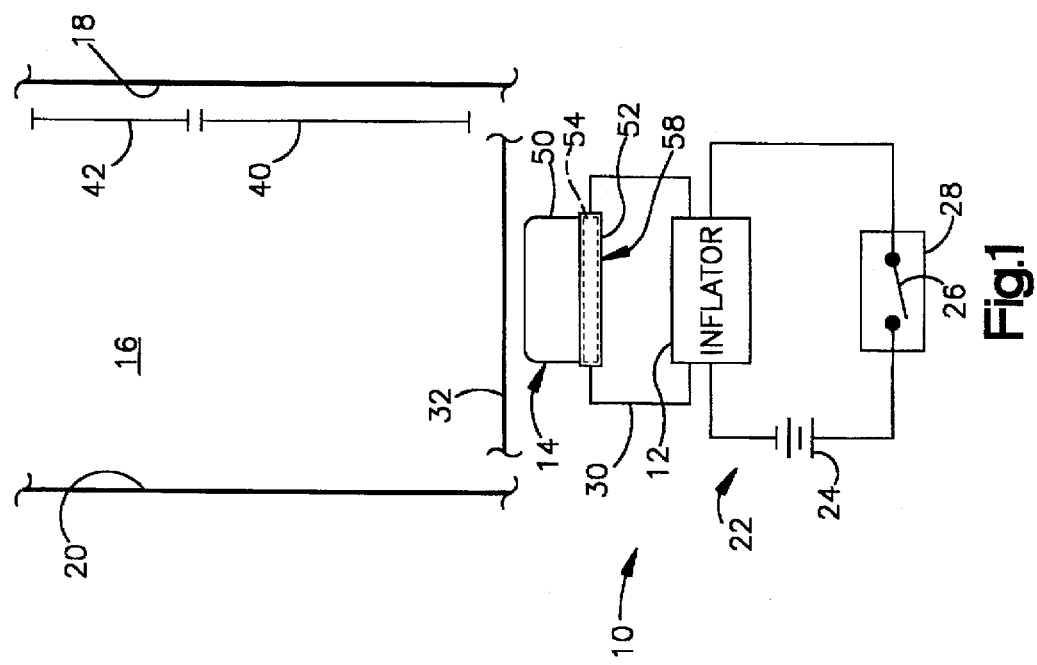
FIG. 1 is a schematic view of an apparatus including an inflatable vehicle occupant protection device comprising a first embodiment of the present invention.

A vehicle occupant protection apparatus 10 comprising a first embodiment of the present invention is shown schematically in FIGS. 1 and 2. The apparatus 10 includes an inflator 12 and a particular type of inflatable vehicle occupant protection device 14 which is known as an air bag. The air bag 14 is inflatable from an uninflated condition, as shown in FIG. 1, to an inflated condition, as shown in FIG. 2. When the air bag 14 is in the inflated condition of FIG. 2, it extends into the vehicle occupant compartment 16 between a vehicle seat 18 and an adjacent door 20 at the side of the vehicle.

The inflator 12 comprises a source of inflation fluid for inflating the air bag 14. As known in the art, the inflator 12 may contain an ignitable gas generating material for generating a large volume of inflation gas. The inflator 12 may alternatively contain a stored quantity of pressurized inflation fluid, or a combination of pressurized inflation fluid and ignitable material for heating the inflation fluid.

As shown schematically in FIG. 1, the inflator 12 is included in an electrical circuit 22 with a power source 24 and a normally open switch 26. The power source 24 is preferably the vehicle battery and/or a capacitor. The switch 26 is part of a sensor 28 which senses a condition indicating the occurrence of a vehicle collision. In the preferred embodiments of the present invention shown in the drawings, the apparatus 10 is actuated upon the occurrence of a side impact vehicle collision. In a side impact vehicle collision, an impact is directed against the vehicle in a direction extending across the vehicle from the door 20 toward the seat 18, i.e., in a direction extending from side to side in the schematic views of FIGS. 1 and 2. Accordingly, the collision-indicating condition sensed by the sensor 28 may comprise, for example, sudden transverse vehicle acceleration or crushing of a side portion of the vehicle.

If the collision indicating condition sensed by the sensor 28 at or above a predetermined threshold level, it indicates the occurrence of a side impact collision having at least a predetermined threshold level of severity. The threshold level of collision severity is a level at which inflation of the air bag 14 is desired to help protect an occupant of the seat 18. The switch 26 then closes and electric current is directed through the inflator 12 to actuate the inflator 12. The inflator 12 then emits a large volume of inflation fluid which flows into the air bag 14 to inflate the air bag 14.

As further shown schematically in FIGS. 1 and 2, the air bag 14 and the inflator 12 are mounted on a supporting structure 30 which, in turn, is mounted on a part 32 of the vehicle adjacent to the vehicle occupant compartment 16. The supporting structure 30 could be a reaction canister, a reaction plate, a manifold, or the like. The part 32 of the vehicle on which the supporting structure 30 is mounted could be any one of several different parts of the vehicle, such as a part of the seat 18, a part of the vehicle floor between the seat 18 and the door 20, a part of the door 20, or a part of another side portion of the vehicle adjacent to the door 20, such as a B-pillar. Depending upon their location in the vehicle, the supporting structure 30 and the corresponding part 32 of the vehicle could be oriented so as to direct the inflating air bag 14 to move in any predetermined direction desired. In any case, the air bag 14 is inflated into the vehicle occupant compartment 16 beside two predetermined regions 40 and 42 of the vehicle occupant compartment 16 which are located between the door 20 and the seat 18. The first predetermined region 40 of the vehicle occupant compartment 16 is adjacent to the ordinary position taken by the thorax of an occupant of the seat 18. The second predetermined region 42 of the vehicle occupant compartment 16, which is above the first predetermined region 40, is adjacent to the ordinary position taken by the head of an occupant of the seat 18. Such predetermined regions of the vehicle occupant compartment 16 correspond to predetermined ranges of vehicle occupant sizes, as known in the art. Accordingly, when the air bag 14 reaches the inflated condition of FIG. 2, it extends into the vehicle occupant compartment 16 so as to protect the occupant's head and thorax from being forcefully struck by the door 20 and/or an external object upon movement of the door 20 or such an object toward the seat 18 as a result of the side impact collision.

The structure of the air bag 14 is defined by panels that can be formed of any suitable air bag material. The panels of air bag material are interconnected along seams which can be formed by stitches, ultrasonic welds, adhesives, heat-staking, or the like, depending on the particular type of air bag panels that are used. Preferably, the air bag 14 is constructed of panels that are formed of a nylon fabric which is coated with silicone. Such an air bag material is known in the art.

As shown in FIGS. 1 and 2, the air bag 14 has a body 50 and a neck 52. When the air bag 14 is being inflated, the body 50 of the air bag is moved from the vehicle part 32 into the vehicle occupant compartment 16. The neck 52 of the air bag 14 is retained on the vehicle part 32 by the supporting structure 30.

Figure 3:
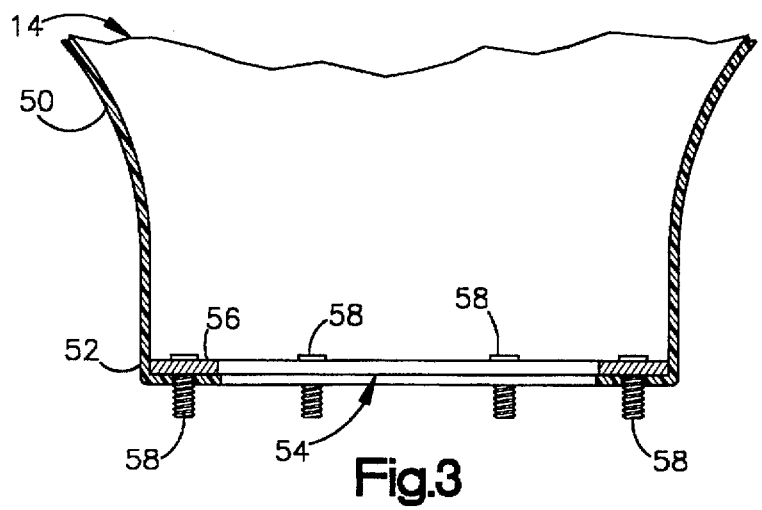
FIG. 3 is an enlarged, partial cross-sectional view of the protection device included in the apparatus of FIGS. 1 and 2.

The neck 52 of the air bag 14 may have any suitable size and shape. As shown by way of example in FIG. 3, the neck 52 defines a circular inlet opening 54. A retainer ring 56 with mounting studs 58 is used to fasten the neck 52 of the air bag 14 to the supporting structure 30 (FIGS. 1 and 2) in a known manner, with the inlet opening 54 being located in a position to receive the inflation fluid emitted from the inflator 12.

Figure 4:
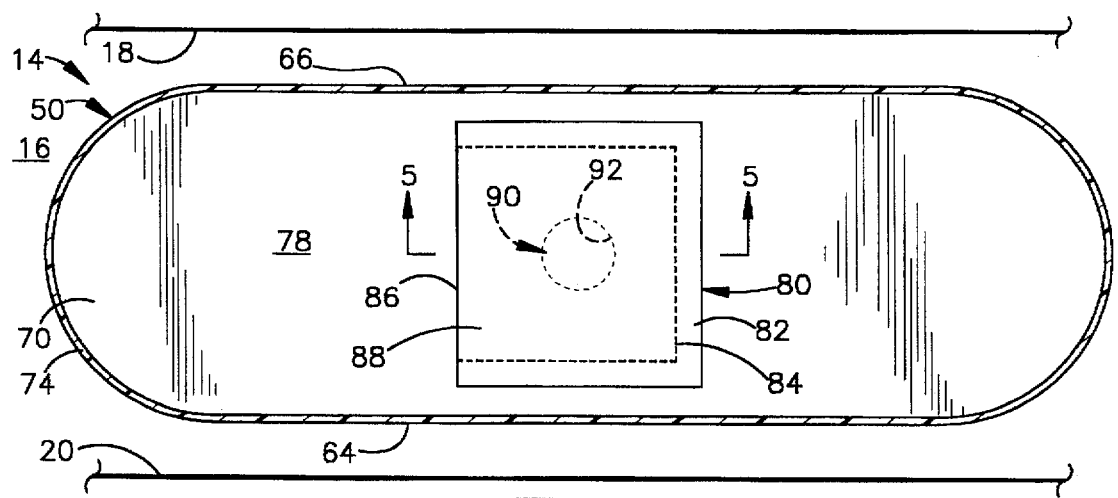
FIG. 4 is a view of the protection device taken on line 4—4 of FIG. 2.

The body 50 of the air bag 14 also may have any suitable size and shape. However, as shown in FIG. 4, the body 50 preferably has an elongated cross-sectional shape when the air bag 14 is in the inflated condition of FIG. 2. The body 50 then has a length extending horizontally alongside the door 20, and has a width extending horizontally across the space between the door 20 and the seat 18.

A divider panel 70 is located inside the body 50 of the air bag 14. When the air bag 14 is in the inflated condition of FIG. 2, the divider panel 70 extends horizontally across the inside of the body 50 so as to divide the panel structure of the body 50 into lower and upper sections 72 and 74. Accordingly, the divider panel 70 and the lower section 72 of the inflated body 50 together define a lower air bag chamber 76 which is located beneath the divider panel 70. The lower section 72 and the lower chamber 76 adjoin the first predetermined region 40 of the vehicle occupant compartment 16. In a similar manner, the divider panel 70 and the upper section 74 of the inflated body 50 together define an upper air bag chamber 78 which is located above the divider panel 70. The upper section 74 and the upper chamber 78 adjoin the second predetermined region 42 of the vehicle occupant compartment 16.

Figure 5:
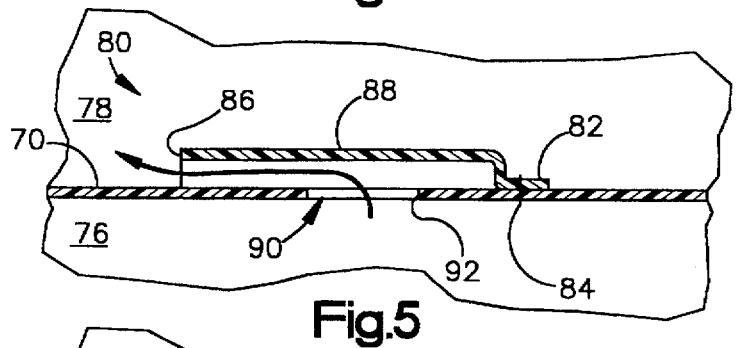
FIG. 5 is a view taken on line 5—5 of FIG. 4.

The air bag 14 further includes a valve 80 for controlling the passage of inflation fluid through the divider panel 70 between the two air bag chambers 76 and 78. As best shown in FIGS. 4 and 5, the valve 80 includes a panel 82 of air bag material. In the first embodiment of the present invention, the valve panel 82 has a square peripheral shape, and is attached to the divider panel 70 at a seam 84 (shown schematically) extending along three sides of the valve panel 82. A free edge 86 of the valve panel 82 extends along a fourth, unattached side of the valve panel 82 between the opposite ends of the seam 84. A movable flap portion 88 of the valve panel 82 has a rectangular shape bounded by the free edge 86 and the seam 84. The flap portion 88 of the valve panel 82 is located directly above an opening 90 defined by an inner edge surface 92 of the divider panel 70. The divider panel 70 may be reinforced around the edge surface 92 to prevent ravelling. This can be accomplished with any suitable reinforcing structure known in the art.

When the air bag 14 is being inflated from the uninflated condition of FIG. 1 toward the inflated condition of FIG. 2, the inflation fluid pressure in the lower chamber 76 is greater than the inflation fluid pressure in the upper chamber 78. This pressure differential holds the valve 80 in the open condition in which it is shown in FIG. 5. Specifically, the pressure in the lower chamber 76 causes the inflation fluid to flow upward through the opening 90 in the divider panel 70. The inflation fluid then impinges upon the flap 88 so as to lift the flap 88 away from the opening 90 and the adjacent portion of the divider panel 70. As indicated by the arrow shown in FIG. 5, the open valve 80 defines an inflation fluid flow path extending from the lower chamber 76 into the valve 80 through the opening 90, and further extending from the valve 80 into the upper chamber 78 past the free edge 86 of the flap 88. A flow of inflation fluid continues along that flow path between the two chambers 76 and 78 throughout the time that the air bag 14 is being inflated toward the condition of FIG. 2. The pressure differential between the two chambers 76 and 78, and hence the flow of inflation fluid, diminishes as the air bag 14 closely approaches the inflated condition of FIG. 2.

As described above, a side impact vehicle collision may cause the door 20 to move across the space between the door 20 and the seat 18. Additionally, an external object, such as a tree or a pole, may move into and across the space between the door 20 and the seat 18. In a roll-over vehicle crash, the road surface or the ground could move into the space between the door 20 and the seat 18 in a similar manner. The door 20, and/or such an external object, will then push the inflated air bag body 50 against the occupant of the seat 18. In most instances, the air bag body 50 will first move against the occupant's thorax, and will subsequently move against the occupant's head.

When the air bag body 50 is moved against the occupant in the foregoing manner, the lower section 72 of the air bag body 50 engages the occupant's thorax in the first predetermined region 40 of the vehicle occupant compartment 16. This will preferably occur within a time period extending from approximately 10 to approximately 30 milliseconds after the inflator 12 is actuated. The lower section 72 of the air bag body 50 is then contracted transversely between the occupant's thorax and the door 20 as the lower section 72 cushions the occupant's thorax. The sudden decrease in the volume of the lower chamber 76 causes the inflation fluid pressure in the lower chamber 76 suddenly to increase substantially above the pressure in the upper chamber 78. This causes an additional amount of inflation fluid to flow into the upper chamber 78 through the valve 80 in the manner described above with reference to FIG. 5. The pressure in the upper chamber 78 then rises above the pressure in the lower chamber 76. The corresponding pressure differential causes the inflation fluid in the upper chamber 78 to close the valve 80 by pushing the flap 88 downward against the divider panel 70, as shown in FIG. 6.

Figure 6:
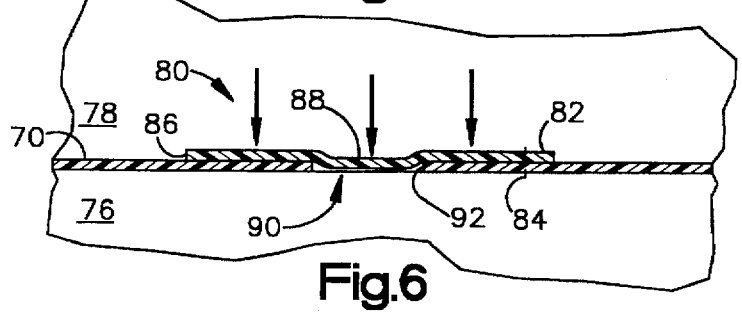
FIG. 6 is a view similar to FIG. 5 showing parts in different positions.
Figure 11:
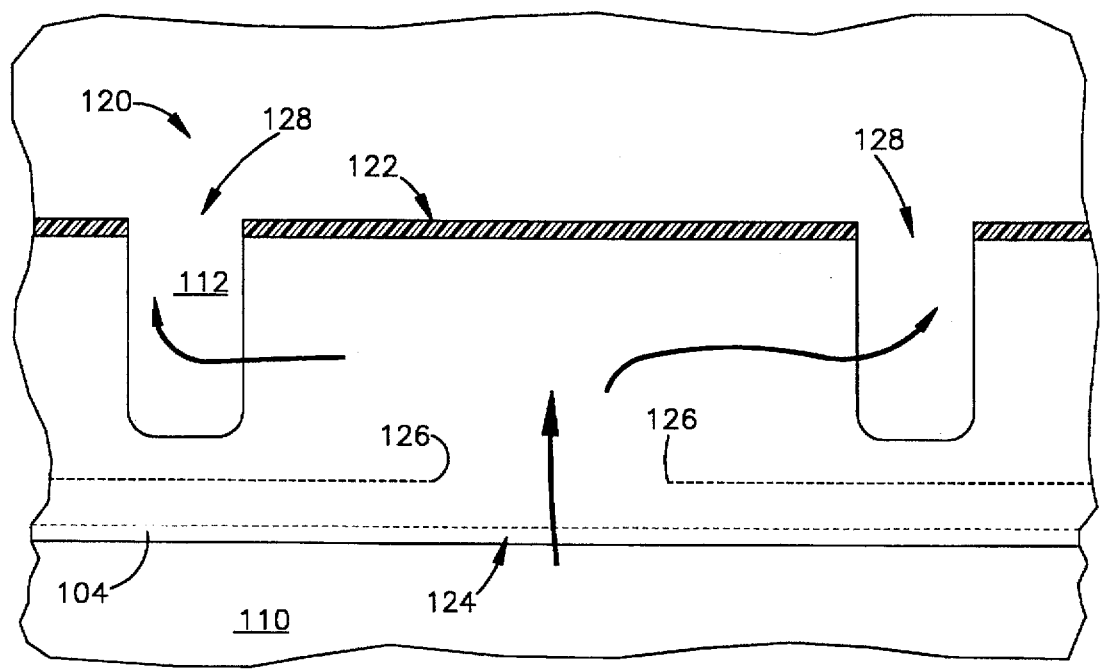
FIG. 11 is a view taken on line 11—11 of FIG. 7.

When the valve 80 is in the closed condition of FIG. 6, it blocks a return flow of inflation fluid from the upper chamber 78 to the lower chamber 76 through the valve 80. The valve 80 thus functions to sustain pressure in the upper chamber 78 for a period of time that lasts at least until the upper section 74 of the air bag body 50 engages the occupant's head. This helps to ensure that the upper section 74 will be pressurized sufficiently to cushion the occupant's head. The valve 80 preferably sustains pressure in the upper chamber 78 in this manner throughout a period of time extending from approximately 30 to approximately 200 milliseconds after the inflator 12 is actuated.

In accordance with a particular feature of the present invention, the air bag material has a low permeability so that deflation of the air bag 14 results primarily from cooling of the inflation fluid rather than passage of the fluid outward through the air bag material. This helps the valve 80 to sustain the pressure in the upper chamber 78. The low permeability is especially beneficial for operation of the valve 80 upon the occurrence of a roll-over vehicle crash because a roll-over vehicle crash may last longer than other side-impact vehicle crashes. In the preferred embodiments of the invention, the coated nylon fabric material has a permeability of no more than 1.5 liters/second/square meter (0.3 cubic feet/minute/ square foot) at 125 Pa (0.5 inches $H_2O$) pressure on the Frazier tester.

A second embodiment of the present invention is shown partially in FIGS. 7–12. In the second embodiment, the vehicle occupant protection apparatus 10 of FIGS. 1 and 2 includes an alternative air bag 100 in place of the air bag 14 described above.

The view of the air bag 100 shown in FIG. 7 corresponds with the view of the air bag 14 shown in FIG. 4. The air bag 100 is thus shown to have a body 102 which is inflatable into the vehicle occupant compartment 16 between the seat 18 and the adjacent door 20. When the body 102 of the air bag 100 is in the inflated condition of FIG. 7, a divider panel 104 extends horizontally across the inside of the body 102 between a lower section 106 of the body 102 and an upper section 108 of the body 102. The divider panel 104 thus separates a lower air bag chamber 110 from an upper air bag chamber 112. As thus far described, the foregoing parts of the air bag 100, and the air bag material of which they are formed, are substantially the same as the corresponding parts of the air bag 14.

The air bag 100 has a valve 120 which differs from the valve 80 described above. The valve 120 is an integral part of the divider panel 104. Specifically, the divider panel 104 is folded to define a loop 122 which projects into the upper chamber 112 along the length of the divider panel 104. A portion of the bottom of the loop 122 is open to define a valve opening 124, but the bottom of the loop 122 is otherwise closed along its entire length by a pair of seams 126 extending longitudinally away from the opposite ends of the opening 124. The top of the loop 122 is open at a pair of gaps 128 which are spaced a short distance from the opposite ends of the opening 124.

Figure 12:
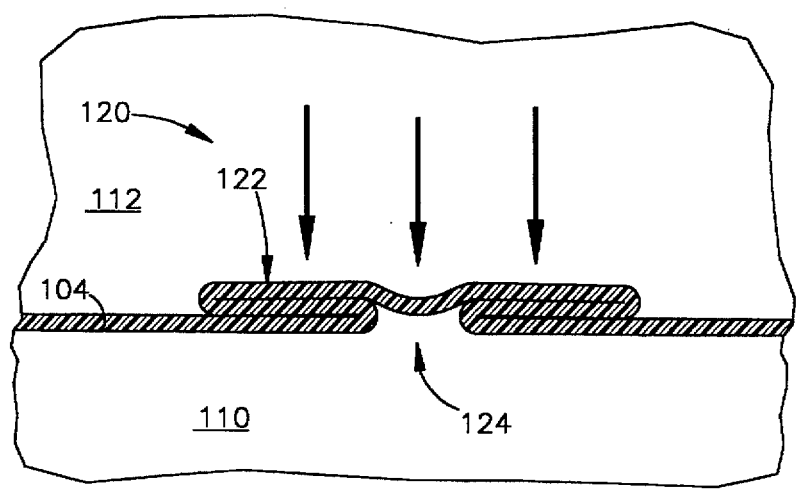
FIG. 12 is a view similar to FIG. 8 showing parts in different positions.

The operation of the valve 120 is substantially similar to the operation of the valve 80 described above. The valve 120 thus remains in an open condition (FIGS. 8 and 11) so as to permit inflation fluid to flow through the valve 120 from the lower chamber 110 to the upper chamber 112 as long as the pressure in the lower chamber 110 exceeds the pressure in the upper chamber 112. When the pressure in the upper chamber 112 is increased above the pressure in the lower chamber 110, the loop 122 functions as a movable valve flap which collapses onto the unfolded portion of the divider panel 104, as shown in FIG. 12. The valve 120 is thus switched to a closed condition under the influence of the pressure in the upper chamber 112. The valve flap 122 then blocks a return flow of inflation fluid through the opening 124 so as to sustain pressure in the upper chamber 112 for a period of time during which a vehicle occupant's head is engaged by the upper section 108 (FIG. 7) of the air bag body 102.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    a first inflatable structure having an inflated location between a vehicle occupant's thorax and a side portion of a vehicle;
    a second inflatable structure having an inflated location between the occupant's head and the side portion of the vehicle; and valve means for increasing the pressure of inflation fluid in said second inflatable structure in response to engagement of the occupant's thorax with said first inflatable structure prior to subsequent engagement of the occupant's head with said second inflatable structure;

said valve means having an open condition permitting said inflation fluid to flow through said valve means from said first inflatable structure to said second inflatable structure under the influence of pressure in said first inflatable structure, said valve means having a closed condition blocking said inflation fluid from flowing back through said valve means from said second inflatable structure to said first inflatable structure under the influence of pressure in said second inflatable structure;

said valve means responding to pressure by remaining in said open condition while said pressure in said first inflatable structure is greater than said pressure in said second inflatable structure, and by switching to said closed condition when said pressure in said second inflatable structure is increased above said pressure in said first inflatable structure;

said valve means comprises a panel of air bag material in a folded configuration defining an opening and a flap in the shape of a loop extending over said opening, said flap being movable into a collapsed condition blocking said opening.

2. Apparatus as defined in claim 1 wherein said first and second inflatable structures are contiguous sections of an inflatable air bag panel structure.

3. Apparatus comprising:

first inflatable means for inflating between a vehicle occupant's thorax and a side portion of a vehicle so as to become contracted between the occupant's thorax and the side portion of the vehicle;

second inflatable means for inflating between the occupant's head and the side portion of the vehicle; and valve means for increasing the pressure of inflation fluid in said second inflatable means to an increased level in response to said contraction of said first inflatable means, said pressure being increased by a flow of said inflation fluid from said first inflatable means to said second inflatable means through said valve means;

said valve means sustaining pressure in said second inflatable means for a period of time by blocking a reverse flow of said inflation fluid through said valve means;

said valve means comprising a panel of air bag material in a folded configuration defining an opening and a flap in the shape of a loop extending over said opening, said flap being movable into a collapsed condition blocking said opening.

4. Apparatus as defined in claim 3 wherein said first and second inflatable structures are contiguous sections of an inflatable air bag panel structure.

* * * * *